(12) United States Patent
Manjunath et al.

(10) Patent No.: US 12,468,655 B2
(45) Date of Patent: Nov. 11, 2025

(54) CONFIGURABLE BUS PARK CYCLE PERIOD

(71) Applicant: QUALCOMM Incorporated, San Diego, CA (US)

(72) Inventors: Nakul Manjunath, Bangalore (IN); Richard Nouri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 36 days.

(21) Appl. No.: 18/442,723

(22) Filed: Feb. 15, 2024

(65) Prior Publication Data

US 2025/0265218 A1    Aug. 21, 2025

(51) Int. Cl.
*G06F 13/42* (2006.01)
(52) U.S. Cl.
CPC ................. *G06F 13/4291* (2013.01)
(58) Field of Classification Search
CPC .................................................. G06F 13/4291
See application file for complete search history.

(56) References Cited

U.S. PATENT DOCUMENTS

| | | | |
|---|---|---|---|
| 10,635,630 B2 | 4/2020 | Mishra et al. | |
| 10,698,849 B2 * | 6/2020 | Murphy | G06F 13/4282 |
| 2008/0059667 A1 * | 3/2008 | Berenbaum | G06F 13/4031 710/110 |
| 2011/0292842 A1 | 12/2011 | Danet | |
| 2015/0067202 A1 | 3/2015 | Wastlhuber | |
| 2017/0220503 A1 * | 8/2017 | Southcombe | G06F 13/404 |
| 2019/0302830 A1 * | 10/2019 | Chen | G06F 1/08 |
| 2021/0216494 A1 * | 7/2021 | Ballantyne | G06F 13/374 |
| 2023/0267085 A1 | 8/2023 | Mishra et al. | |

OTHER PUBLICATIONS

Emerson: "Interconnect Considerations for MIPI® RFFE", Updated Mar. 22, 2023, 17 Pages.
Wilkerson V., "Unification in the RF front-End: The New MIPI Standard", EE Times, Designlines, RF and Microwave Designline, Aug. 11, 2010, 8 Pages.

* cited by examiner

*Primary Examiner* — Henry Tsai
*Assistant Examiner* — Aurangzeb Hassan
(74) *Attorney, Agent, or Firm* — Moore IP

(57) ABSTRACT

A principal device includes a protocol controller coupled, via a serial bus, to one or more subordinate devices. The serial bus includes a clock wire and a data wire. The protocol controller is configured to send, on the data wire, a read command addressed to a subordinate device to initiate a read transaction. The protocol controller is also configured to modify a clock signal on the clock wire to extend a bus park cycle period. The bus park cycle period is extended based on a data preparation delay associated with the subordinate device. The protocol controller is further configured to, subsequent to the bus park cycle period, read data from the data wire during the read transaction.

20 Claims, 5 Drawing Sheets

CONFIGURABLE BUS PARK CYCLE PERIOD

I. FIELD

The present disclosure is generally related to bus park cycle period configuration.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often include components, such as processing circuits, antennas, filters, storage devices, peripheral devices, etc., that communicate via a serial bus. The MIPI® (a registered trademark of MIPI Alliance, Inc.) alliance has defined a Radio Frequency Front End (RFFE) interface for communication among radio frequency (RF) front-end devices. For example, the RFFE interface enables communication between a principal device and one or more subordinate devices (e.g., RFFE components) over a serial bus. The principal device may also be referred to as a "master" device and a subordinate device may also be referred to as a "slave" device.

According to the RFFE interface, a read command from the principal device over the serial bus to a subordinate device is followed by a bus park after which the subordinate device is expected to provide the requested data on the serial bus. Typically, the bus park has a one clock cycle duration that can be insufficient for the requested data to be available to send at the subordinate device. The data retrieved by the principal device from the serial bus subsequent to the bus park can thus be invalid.

III. SUMMARY

According to one implementation of the present disclosure, a principal device includes a protocol controller coupled, via a serial bus, to one or more subordinate devices. The serial bus includes a clock wire and a data wire. The protocol controller is configured to send, on the data wire, a read command addressed to a subordinate device to initiate a read transaction. The protocol controller is also configured to modify a clock signal on the clock wire to extend a bus park cycle period. The bus park cycle period is extended based on a data preparation delay associated with the subordinate device. The protocol controller is further configured to, subsequent to the bus park cycle period, read data from the data wire during the read transaction.

According to another implementation of the present disclosure, a method includes sending, on a data wire of a serial bus from a principal device, a read command addressed to a subordinate device to initiate a read transaction. The principal device is coupled via the serial bus to one or more subordinate devices. The method also includes modifying, at a protocol controller of the principal device, a clock signal on a clock wire of the serial bus to extend a bus park cycle period. The bus park cycle period is extended based on a data preparation delay associated with the subordinate device. The method further includes, subsequent to the bus park cycle period, reading data from the data wire during the read transaction.

According to another implementation of the present disclosure, a non-transitory computer-readable medium storing instructions that, when executed by one or more processors, cause the one or more processors to send, on a data wire of a serial bus from a principal device, a read command addressed to a subordinate device to initiate a read transaction. The principal device is coupled via the serial bus to one or more subordinate devices. The instructions also cause the one or more processors to modify, at a protocol controller of the principal device, a clock signal on a clock wire of the serial bus to extend a bus park cycle period, the bus park cycle period extended based on a data preparation delay associated with the subordinate device. The instructions further cause the one or more processors to, subsequent to the bus park cycle period, read data from the data wire during the read transaction.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

According to the RFFE interface defined by the MIPI® alliance, a read command from the principal device over the serial bus to a subordinate device is followed by a bus park after which the subordinate device is expected to provide the requested data on the serial bus. Typically, a bus park cycle period corresponds to one clock cycle of a local clock at the principal device. In some cases, at the end of the bus park, the requested data is not available to send at the subordinate device and the serial bus has invalid data.

To retrieve valid data from the serial bus, the principal device can send multiple identical read requests. For example, the principal device can send a first read request on the serial bus, ignore data on the serial bus after a one clock cycle bus park subsequent to the first read request, send a second read request on the serial bus, and read data on the serial bus after a one clock cycle bus park subsequent to the second read request. When the one clock cycle bus park subsequent to the second read request is complete, the subordinate device is more likely to have the requested data available to send and the principal device is more likely to retrieve valid data from the serial bus. However, sending multiple requests for each read reduces data throughput and increases latency.

Systems and methods of configuring a bus park cycle period are disclosed. As an example, a principal device includes a protocol controller that is coupled via a serial bus to one or more subordinate devices. The protocol controller sends, via a data wire of the serial bus, a read command addressed to a subordinate device to initiate a read transaction. The protocol controller modifies a clock signal on a clock wire of the serial bus to extend a bus park cycle period. For example, the protocol controller extends the bus park cycle period to correspond to one or more additional clock cycles of a local clock of the principal device. The extended bus park cycle period corresponds to a single pulse of the clock signal on the clock wire. The subordinate device, in response to detecting the end of the bus park corresponding to the single pulse of the clock signal, sends the requested data via the data wire of the serial bus. The extended bus park cycle period corresponding to multiple clock cycles of a local clock increases a likelihood that the requested data is available at the subordinate device to send at the end of the bus park and increases a likelihood that the principal device retrieves valid data after the bus park. Extending the bus park cycle period has a lower impact on data throughput and latency compared to sending multiple requests for the same read.

Figure 1:
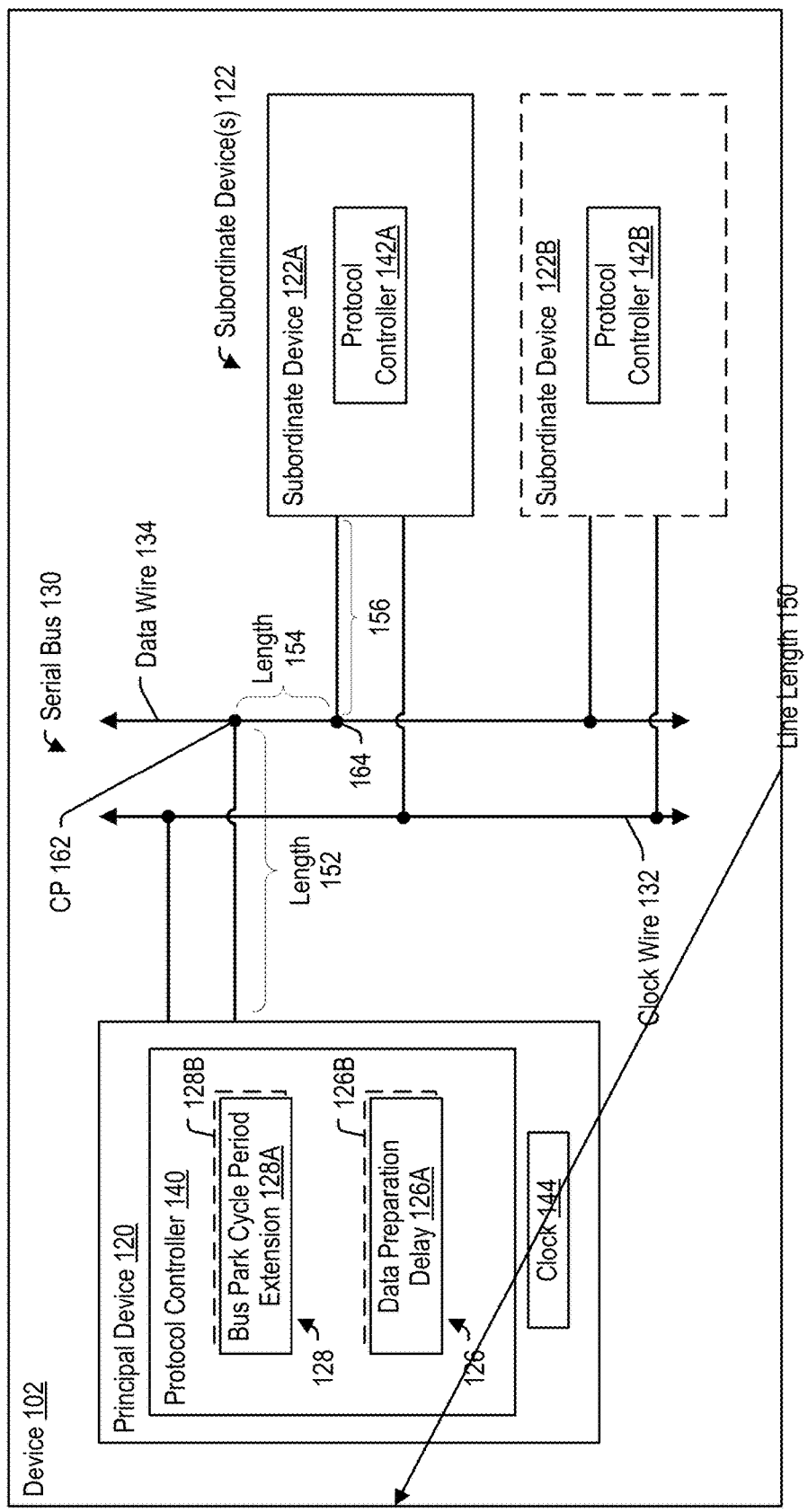
FIG. 1 is a block diagram of a particular illustrative aspect of a system operable to configure a bus park cycle period, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more subordinate devices ("subordinate device(s)" 122 of FIG. 1), which indicates that in some implementations the device 102 includes a single subordinate device 122 and in other implementations the device 102 includes multiple subordinate devices 122. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple subordinate devices are illustrated and associated with reference numbers 122A and 122B. When referring to a particular one of these subordinate devices, such as a subordinate device 122A, the distinguishing letter "A" is used. However, when referring to any arbitrary one of these subordinate devices or to these subordinate devices as a group, the reference number 122 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 operable to configure a bus park cycle period is disclosed. The system 100 includes a device 102 that includes a principal device 120 coupled via a serial bus 130 to one or more subordinate devices 122, such as a subordinate device 122A, a subordinate device 122B, one or more additional subordinated devices, or a combination thereof.

The principal device 120 includes a protocol controller 140 and a clock 144 (e.g., a local clock). A subordinate device 122 includes a protocol controller 142. For example, the subordinate device 122A includes a protocol controller 142A. As another example, the subordinate device 122B includes a protocol controller 142B. The serial bus 130 includes a clock wire 132 and a data wire 134.

In some implementations, the protocol controller 140 of the principal device 120 is integrated in an RF front-end device. In some aspects, the principal device 120 and the one or more subordinate devices 122 operate in compliance with a RFFE MIP alliance specification. In a particular aspect, the principal device 120 and a subordinate device 122 correspond to a "master" device and a "slave" device, respectively, in compliance with an RFFE interface defined by the MIPI® Alliance. In a particular aspect, the principal device 120 (e.g., the protocol controller 140) is configured to drive a clock signal on the clock wire 132, and is configured to send one or more commands on the data wire 134 to the one or more subordinate devices 122. In a particular aspect, the subordinate device 122 (e.g., the protocol controller 142) is configured to detect the clock signal on the clock wire 132 and to perform one or more commands received on the data wire 134. As illustrative, non-limiting examples, a command can include a register read command to read data from a particular register, or a register write command to write data to a particular register.

In some implementations, components of the device 102 can switch roles between principal or subordinate device, with a single component coupled to the serial bus 130 corresponding to a principal device 120 at a given time. To illustrate, for a first transaction, a particular component coupled to the serial bus 130 corresponds to a principal device 120 and the remaining components coupled to the serial bus 130 correspond to subordinate devices 122. For a second transaction, another component coupled to the serial bus 130 can correspond to a principal device 120 and the remaining components coupled to the serial bus 130 can correspond to subordinate devices 122.

In some implementations, the principal device 120 includes a baseband processor of the device 102. In some implementations, the subordinate device(s) 122 include RFFE components, such as a power amplifier, a transmitter, a filter, a switch, a receiver, a low-noise amplifier, an antenna, a tuner, a processing circuit, a storage device, or a combination thereof. Although the principal device 120 and the subordinate device(s) 122 are illustrated as internal to the device 102, in other implementations the principal device 120, the subordinate device(s) 122, or a combination thereof, can be external to the device 102 and coupled to the serial bus 130.

During operation, the protocol controller 140 obtains data indicating one or more data preparation delays 126 of the one or more subordinate devices 122. For example, the protocol controller 140 obtains data indicating a data preparation delay 126A of the subordinate device 122A, a data preparation delay 126B of the subordinate device 122B, or both. In a particular aspect, the data preparation delay 126A is based on at least one of line length 150, a structural latency, an internal clock frequency, clock domain crossing, or memory access latency associated with the subordinate device 122A. In a particular example, the memory access latency corresponds to an expected delay between initiating a read at a register and obtaining data from the register at the subordinate device 122A, the line length 150 corresponds to an expected delay between sending data from the subordinate device 122A and the data being received at the principal device 120, the clock domain crossing corresponds to an expected delay associated with switching from one clock domain to another clock domain, or a combination thereof.

In some aspects, the line length 150 is based on a length 152 of a first wire between the principal device 120 and a connection point (CP) 162 of the data wire 134, a length 154 of the data wire 134 between the connection point 162 and a connection point 164 of the data wire 134, and a length 156 of a second wire between the connection point 164 and the subordinate device 122A. The data wire 134 between the connection point 162 and the connection point 164 corresponds to a portion of the shared bus (e.g., the serial bus 130). Similarly, in a particular aspect, the data preparation delay 126B is based on at least one of line length, clock domain crossing, or memory access latency associated with the subordinate device 122B.

In some aspects, the data preparation delay 126A is distinct from the data preparation delay 126B. In an example, the data preparation delay 126A is less than the data preparation delay 126B because at least one of the line length 150, a clock domain crossing, or memory access latency of the subordinate device 122A is less than at least a corresponding one of a line length, a clock domain crossing, or memory access latency of the subordinate device 122B. To illustrate, a duration of the data preparation delay 126B is longer than a duration of the data preparation delay 126A.

In some aspects, the data preparation delay 126A is the same as the data preparation delay 126B. For example, the data preparation delay 126A is the same as the data preparation delay 126B because at least one of the line length 150, a clock domain crossing, or memory access latency of the subordinate device 122A is equal to at least one of a line length, a clock domain crossing, or memory access latency, respectively, of the subordinate device 122B. In another example, the data preparation delay 126A is the same as the data preparation delay 126B because the data preparation delay 126A and the data preparation delay 126B are based on a representative (e.g., average) data preparation delay. In a particular aspect, the data indicating the one or more data preparation delays 126 is based on a configuration setting, default data, a user input, or a combination thereof.

The protocol controller 140 determines one or more bus park cycle period extensions 128 based on the one or more data preparation delays 126 associated with at least one of the one or more subordinate devices 122. For example, the protocol controller 140 determines a bus park cycle period extension 128A for the subordinate device 122A, determines a bus park cycle period extension 128B for the subordinate device 122B, one or more additional bus park cycle period extensions 128 for one or more additional subordinate devices 122, or a combination thereof, based on the one or more data preparation delays 126. In a particular aspect, a bus park cycle period extension 128 of a subordinate device 122 indicates an extension, if any, of a bus park cycle period that is likely to be long enough for valid data to be available at the subordinate device 122 responsive to a read command addressed to the subordinate device 122, as further described with reference to FIG. 2A.

In a particular implementation, multiple of the one or more bus park cycle period extensions 128 are the same. For example, each of the bus park cycle period extension 128A and the bus park cycle period extension 128B is based on a representative (e.g., average) bus park cycle period extension. In a particular aspect, the representative bus park cycle period extension is based on a representative (e.g., an average, a minimum, or a maximum) data preparation delay of the data preparation delay 126A and the data preparation delay 126B. For example, the protocol controller 140, in response to determining that the data preparation delay 126B is greater than the data preparation delay 126A, determines each of the bus park cycle period extension 128A and the bus park cycle period extension 128B based on the data preparation delay 126B. To illustrate, in some implementations, the protocol controller 140, in response to determining that the data preparation delay 126B is greater than the data preparation delay 126A, uses the data preparation delay 126B to determine a representative bus park cycle period extension that is designated as the bus park cycle period extension 128A and the bus park cycle period extension 128B.

In a particular example, the protocol controller 140 can determine a representative bus park cycle period extension (e.g., the bus park cycle period extension 128A and the bus park cycle period extension 128B) based on a weighted sum of the data preparation delay 126A and the data preparation delay 126B, where a first weight is applied to the data preparation delay 126A and a second weight is applied to the data preparation delay 126B. To illustrate, a first weight of zero and a second weight of one is equivalent to the representative bus park cycle period extension corresponding to a minimum data preparation delay when the data preparation delay 126A is less than or equal to the data preparation delay 126B. Determining the representative bus park cycle period extension corresponding to the minimum data preparation delay prioritizes reduced latency. In another example, a first weight of one and a second weight of zero is equivalent to the representative bus park cycle period extension corresponding to a maximum data preparation delay when the data preparation delay 126A is greater than or equal to the data preparation delay 126B. Determining the representative bus park cycle period extension corresponding to the maximum data preparation delay prioritizes increased accuracy. Combinations of weights between the minimum data preparation delay and the maximum data preparation delay can be used to balance reduced latency and increased accuracy.

In a particular implementation, the bus park cycle period extension 128A is distinct from the bus park cycle period extension 128B. For example, the bus park cycle period extension 128A is based on the data preparation delay 126A, and the bus park cycle period extension 128B is based on the data preparation delay 126B. Optionally, in some aspects, the bus park cycle period extension 128A is independent of the data preparation delay 126B, the bus park cycle period extension 128B is independent of the data preparation delay 126A, or both. Optionally, in some implementations, the bus park cycle is extended for a subset of the one or more subordinate devices 122. For example, the bus park cycle period extension 128A indicates no extension when the data preparation delay 126A is below a threshold, and the bus park cycle period extension 128B indicates an extension when the data preparation delay 126B is greater than the threshold. Particular illustrative examples of determining the bus park cycle period extension 128A and the bus park cycle period extension 128B are meant to be non-limiting. It should be understood that the protocol controller 140 can use various techniques of determining the bus park cycle period extension 128A based on at least one of the one or more data preparation delays 126, and determining the bus park cycle period extension 128B based on at least one of the one or more data preparation delays 126.

In some implementations, the protocol controller 140 obtains data indicating the one or more bus park cycle period extensions 128. To illustrate, the data indicating the one or more bus park cycle period extensions 128 can be based on a configuration setting, default data, user input, or a combination thereof.

The protocol controller 140 of the principal device 120 sends, on the data wire 134 of the serial bus 130, a read command addressed to a subordinate device 122A to initiate a read transaction, as further described with reference to FIG. 2A. For example, the read command identifies a register from which the subordinate device 122A is to read data to send on the data wire 134. In a particular aspect, the protocol controller 140 sends the read command in response to receiving a data request from another component of the device 102.

The protocol controller 140 selectively modifies the clock signal to extend the bus park cycle period. For example, the protocol controller 140, in response to determining that the data preparation delay 126A is less than a threshold, generates the bus park cycle period extension 128A having a first value (e.g., 0) to indicate no extension of the bus park cycle period. Alternatively, the protocol controller 140, in response to determining that the data preparation delay 126A is greater than or equal to the threshold, generates the bus park cycle period extension 128A having another value (e.g., greater than 0) indicating an extension of the bus park cycle period. To illustrate, in some embodiments, the protocol controller 140 can select a value of the bus park cycle period extension 128A based on a difference between the data preparation delay 126A and the threshold.

The protocol controller 140 operates in compliance with a two-wire protocol that supports bus park. For example, the protocol controller 140 puts the data wire 134 into a bus park when data on the data wire 134 switches direction. To illustrate, after sending the read command on the data wire 134, the data wire 134 is put in a bus park prior to reading data on the data wire 134.

The protocol controller 140 modifies the bus park cycle period based on the bus park cycle period extension 128A. For example, the protocol controller 140, in response to determining that the bus park cycle period extension 128A has a first value (e.g., 0) indicating no extension of the bus park cycle period, refrains from extending the bus park cycle period, as further described with reference to FIG. 2A. In an example, without the modification, the bus park cycle period corresponds to a single clock cycle of the clock 144. To illustrate, the protocol controller 140 sends a pulse on the clock wire 132 corresponding to a single clock cycle of the clock 144, as further described with reference to FIG. 2A.

Alternatively, the protocol controller 140, in response to determining that the bus park cycle period extension 128A has a value (e.g., greater than 0) indicating an extension of the bus park cycle period, modifies a clock signal on the clock wire 132 to extend a bus park cycle period, as further described with reference to FIG. 2B. For example, the protocol controller 140 sends a pulse on the clock wire 132 corresponding to a particular count of clock cycles of the clock 144 that is indicated by the bus park cycle period extension 128A, as further described with reference to FIG. 2B. The modification thus changes a duration of a single clock pulse of the clock signal on the clock wire 132 based on clock cycles of the clock 144 that correspond to a duration of a bus park. The bus park cycle period is thus extended for a single clock pulse of the clock signal on the clock wire 132.

The protocol controller 142A of the subordinate device 122A, in response to receiving the read command on the data wire 134 addressed to the subordinate device 122A, retrieves the data requested from the register indicated in the read command, as further described with reference to FIG. 2A. The protocol controller 142A, subsequent to receiving the read command and in response to detecting the single clock pulse of the clock signal on the clock wire 132 indicating the end of the bus park, sends the retrieved data on the data wire 134, as further described with reference to FIGS. 2A-2B. The protocol controller 140, subsequent to sending the single clock pulse of the clock signal on the clock wire 132 corresponding to the bus park cycle period, reads data from the data wire 134 during the read transaction.

Optionally, in some implementations, the bus park can have one bus park cycle period for a read transaction with the subordinate device 122A and another bus park cycle period for a read transaction with the subordinate device 122B. For example, the protocol controller 140 sends a first read command on the data wire 134 addressed to the subordinate device 122A to initiate a first read transaction, selectively modifies the clock signal on the clock wire 132 to extend a first bus park cycle period to correspond to the bus park cycle period extension 128A that is based on the data preparation delay 126A, and reads first data from the data wire 134 during the first read transaction. Subsequently, the protocol controller 140 sends a second read command on the data wire 134 addressed to the subordinate device 122B to initiate a second read transaction, selectively modifies the clock signal on the clock wire 132 to extend a second bus park cycle period to correspond to the bus park cycle period extension 128B that is based on the data preparation delay 126B, and reads second data from the data wire 134 during the second read transaction. In some examples, the second bus park cycle period has a second duration that is longer than a first duration of the first bus park cycle period.

The system 100 thus enables the subordinate device 122A to have more time (when the bus park cycle period is extended) to retrieve the requested data while complying with the RFFE interface by providing the requested data at the end of a single bus park cycle. Selectively extending the bus park cycle period can balance increasing a likelihood that a subordinate device 122 that has a higher data preparation delay 126 has valid data at the end of the extended bus park cycle period, with maintaining higher throughput and lower latency for another subordinate device 122 that has a lower data preparation delay 126 and is likely to have valid data independently of extending the bus park cycle period.

Figure 2A:
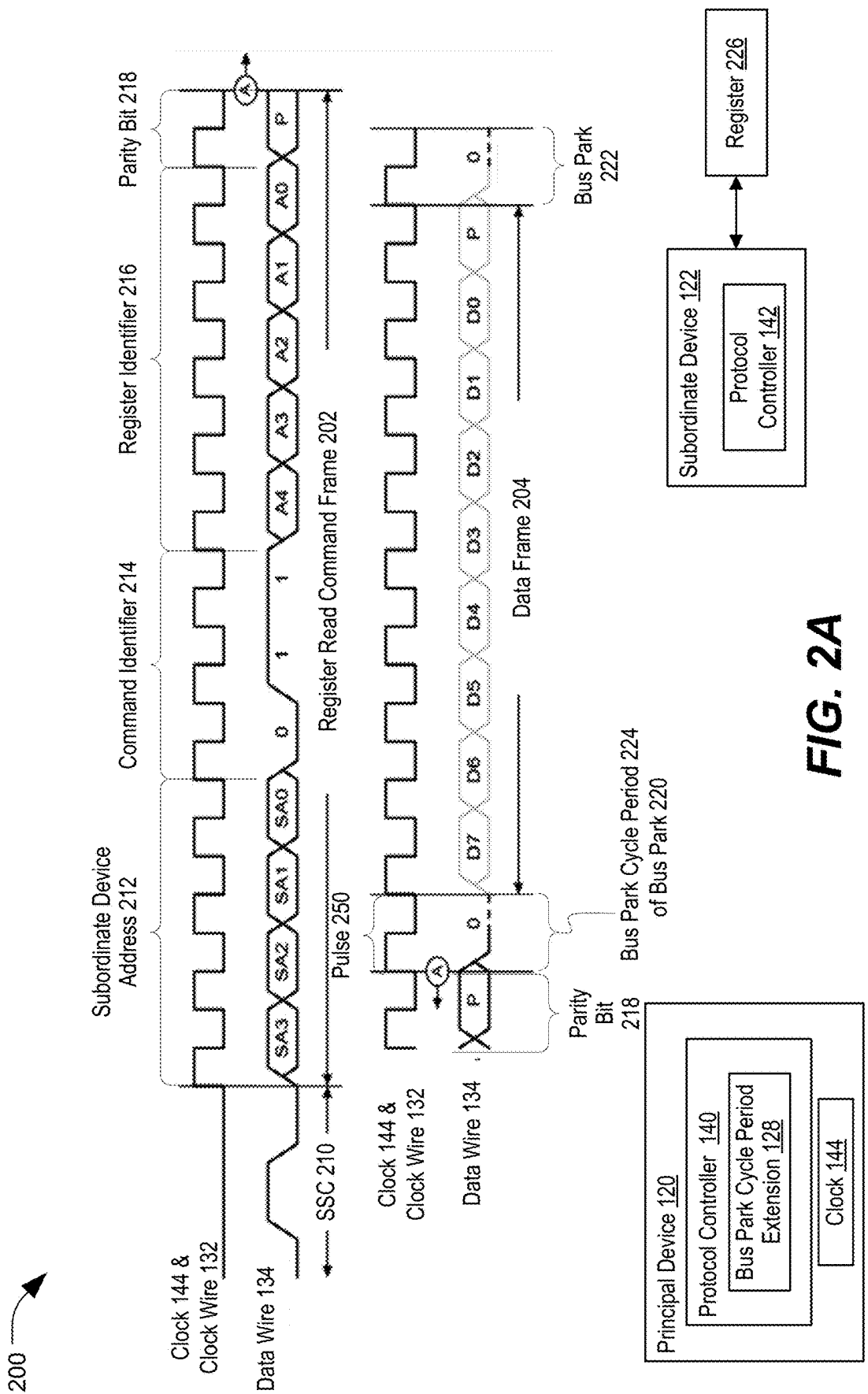
FIG. 2A is a diagram of an illustrative aspect of operations associated with a particular configuration of a bus park cycle period, in accordance with some examples of the present disclosure.

FIG. 2A is a diagram of an illustrative aspect of operations 200 associated with a particular configuration of a bus park cycle period, in accordance with some examples of the present disclosure. The protocol controller 140 of the principal device 120 drives a clock signal on the clock wire 132 to correspond to clock cycles of the clock 144 prior to and during sending of a read command on the data wire 134. For example, a pulse of the clock signal on the clock wire 132 corresponds to a clock cycle of the clock 144.

The protocol controller 140 sends a read command on the data wire 134. For example, the protocol controller 140 sends, on the data wire 134, a sequence start condition (SSC) 210 followed by a register read command frame 202. The register read command frame 202 indicates a subordinate device address 212 of a subordinate device 122 and a command identifier 214 (e.g., 011) of a register read command. The register read command frame 202 also includes a register identifier 216 of a register 226 from which the subordinate device 122 is to read data. The register read command frame 202 may also include a parity bit 218. The register 226 is coupled to the device 102 of FIG. 1. In some examples, the register 226 is integrated in the device 102. In other examples, the register 226 is external to the device 102.

In the example illustrated in FIG. 2A, the protocol controller 140 of the principal device 120 determines that a bus park cycle period extension 128 of a subordinate device 122 indicates no extension of a bus park cycle period for the subordinate device 122 and refrains from modifying the clock signal on the clock wire 132. For example, a pulse 250 of the clock signal on the clock wire 132 that corresponds to a bus park cycle period 224 of a bus park 220 has the same duration as a single clock cycle of the clock 144.

The protocol controller 142 of the subordinate device 122, in response to receiving the register read command frame 202 and determining that the register identifier 216 indicates that the register read command frame 202 is addressed to the subordinate device 122, initiates a read from the register 226 indicated by the register identifier 216. The protocol controller 142, in response to detecting the end of the pulse 250 corresponding to an end of the bus park 220 and determining that data has been received from the register 226, sends a data frame 204 on the data wire 134 corresponding to the data read from the register 226.

The protocol controller 140 of the principal device 120, subsequent to sending the pulse 250 on the clock wire 132, reads data from the data wire 134. In some aspects, the data frame 204 is followed by a bus park 222. If data from the register 226 had successfully been received by the subordinate device 122 and sent on the data wire 134 at the end of the bus park 220, the principal device 120 retrieves valid data from the data wire 134.

Figure 2B:
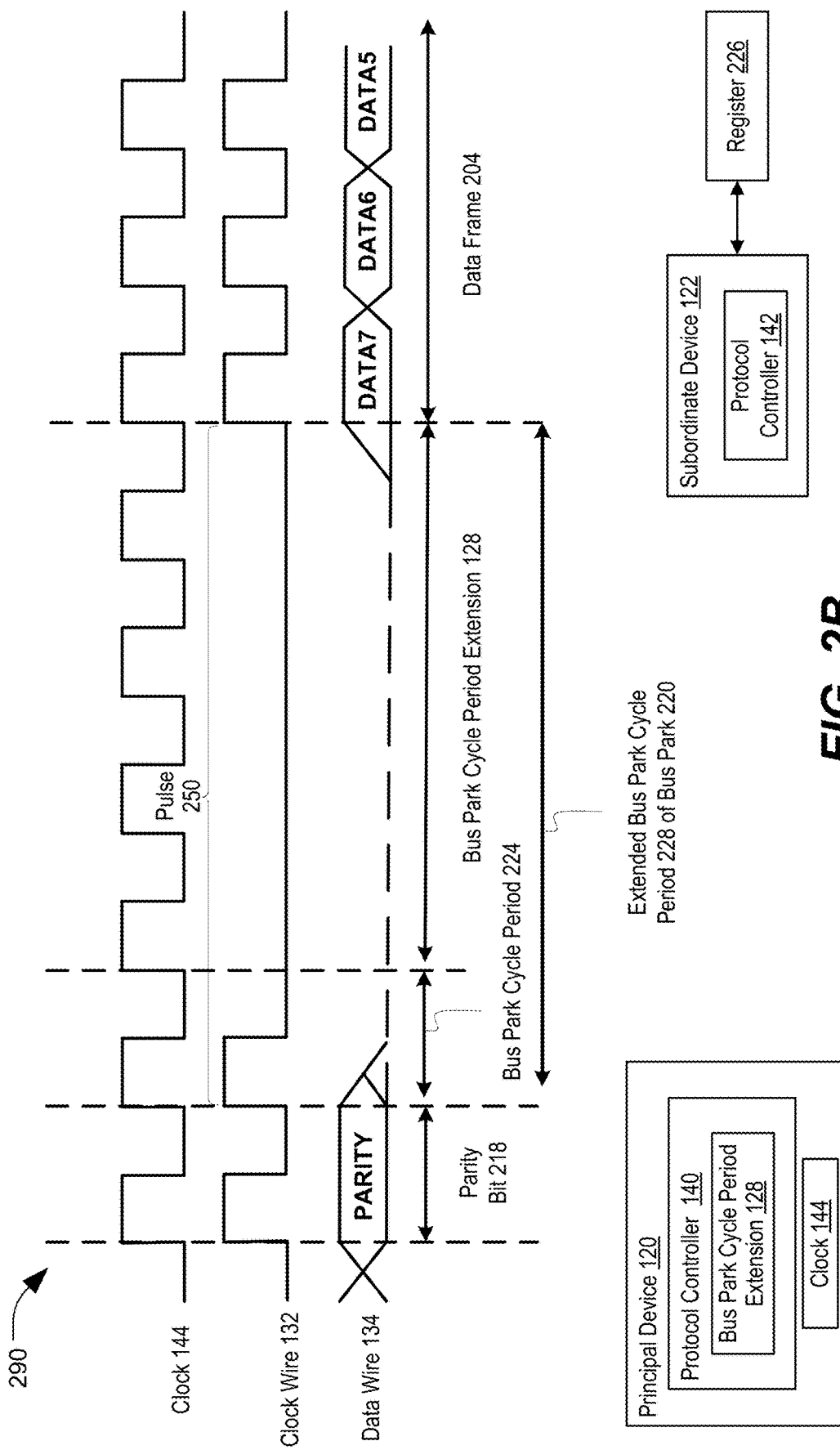
FIG. 2B is a diagram of an illustrative aspect of operations associated with another particular configuration of a bus park cycle period, in accordance with some examples of the present disclosure.

FIG. 2B is a diagram of an illustrative aspect of operations 290 associated with another particular configuration of a bus park cycle period, in accordance with some examples of the present disclosure.

The protocol controller 140 of the principal device 120, subsequent to sending the register read command frame 202, as described with reference to FIG. 2A, determines that a bus park cycle period extension 128 of a subordinate device 122 indicates an extension of a bus park cycle period for the subordinate device 122 and modifies the clock signal on the clock wire 132 based on the bus park cycle period extension 128. In a particular aspect, the bus park cycle period extension 128 indicates an extension of a bus park cycle period based on a line length 150 between the principal device 120 and the subordinate device 122 that is greater than 15 centimeters. In an example, the bus park cycle period extension 128 indicates that a bus park cycle period of the bus park 220 is to be extended by a particular count (e.g., greater than or equal to 1) of clock cycles of the clock 144.

The protocol controller 140 modifies the pulse 250 of the clock signal on the clock wire 132 based on the bus park cycle period extension 128. For example, the protocol controller 140 modifies the pulse 250 to correspond to an extended bus park cycle period 228 that corresponds to a sum of clock cycles (e.g., 1 clock cycle) of the clock 144 associated with the bus park cycle period 224 and the count of clock cycles of the clock 144 indicated by the bus park cycle period extension 128. In a particular aspect, the count of clock cycles indicated by the bus park cycle period extension 128 is less than a count of clock cycles associated with sending another SSC 210, another register read command frame 202, and another bus park cycle period 224. A technical advantage of extending the bus park 220 from having the bus park cycle period 224 to having the extended bus park cycle period 228 can include increased throughput and reduced latency as compared to sending multiple requests for the same read.

The protocol controller 142, in response to detecting the end of the pulse 250 corresponding to an end of the bus park 220 and determining that data has been received from the register 226, sends a data frame 204 on the data wire 134 corresponding to the data read from the register 226.

The protocol controller 140 of the principal device 120, subsequent to sending the pulse 250 on the clock wire 132, reads data from the clock wire 132. In some aspects, the data frame 204 is followed by a bus park 222. If data from the register 226 had successfully been received by the subordinate device 122 and sent on the data wire 134 at the end of the bus park 220, the principal device 120 retrieves valid data from the data wire 134. A technical advantage of extending the duration of the bus park 220 by the count of clock cycles of the clock 144 indicated by the bus park cycle period extension 128 includes increasing a likelihood that the subordinate device 122 has data available from the register 226 to send on the data wire 134 at the end of the bus park 220. Hence, the principal device 120 is more likely to retrieve valid data from the data wire 134 subsequent to the bus park 220.

Figure 3:
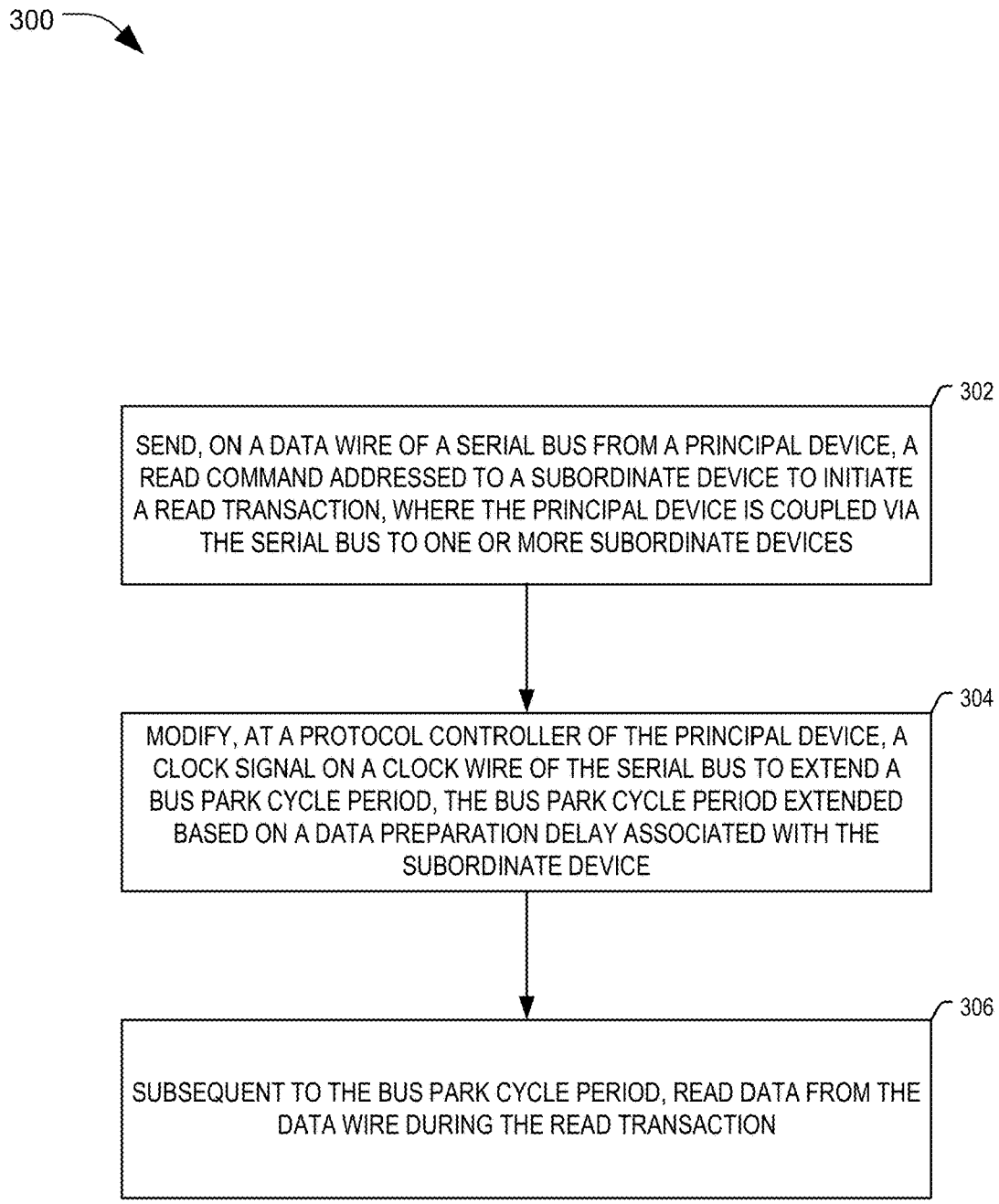
FIG. 3 is a diagram of a particular implementation of a method of configuration of a bus park cycle period that may be performed by the system of FIG. 1, in accordance with some examples of the present disclosure.

Referring to FIG. 3, a particular implementation of a method 300 of configuration of a bus park cycle period is shown. In a particular aspect, one or more operations of the method 300 are performed by at least one of the protocol controller 140, the principal device 120, the device 102, the system 100 of FIG. 1, or a combination thereof.

The method 300 includes, at block 302, sending, on a data wire of a serial bus from a principal device, a read command addressed to a subordinate device to initiate a read transaction, where the principal device is coupled via the serial bus to one or more subordinate devices. For example, the protocol controller 140 sends, on a data wire 134 of a serial bus 130 from a principal device 120, a read command (e.g., the register read command frame 202 of FIG. 2A) addressed to a subordinate device 122 to initiate a read transaction. The principal device 120 is coupled via the serial bus 130 to one or more subordinate devices 122, as described with reference to FIG. 1.

The method 300 also includes, at block 304, modifying, at a protocol controller of the principal device, a clock signal on a clock wire of the serial bus to extend a bus park cycle period, the bus park cycle period extended based on a data preparation delay associated with the subordinate device. For example, the protocol controller 140 of the principal device 120 modifies a clock signal on a clock wire 132 of the serial bus 130 to extend a bus park cycle period 224 to an extended bus park cycle period 228, as described with reference to FIG. 2B. The bus park cycle period 224 extended to the extended bus park cycle period 228 based on a data preparation delay 126 associated with the subordinate device 122.

The method 300 further includes, at block 306, subsequent to the bus park cycle period, reading data from the data wire during the read transaction. For example, the protocol controller 140 of the principal device 120, subsequent to the extended bus park cycle period 228, reads data from the data wire 134 during the read transaction, as described with reference to FIG. 2B.

The method 300 increases a likelihood that the subordinate device 122 has data available to send at the end of the extended bus park cycle period 228. The principal device 120 is thus more likely to retrieve valid data from the data wire 134 at the end of the bus park 220.

The method 300 of FIG. 3 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 300 of FIG. 3 may be performed by a processor that executes instructions, such as described with reference to FIG. 4.

Figure 4:
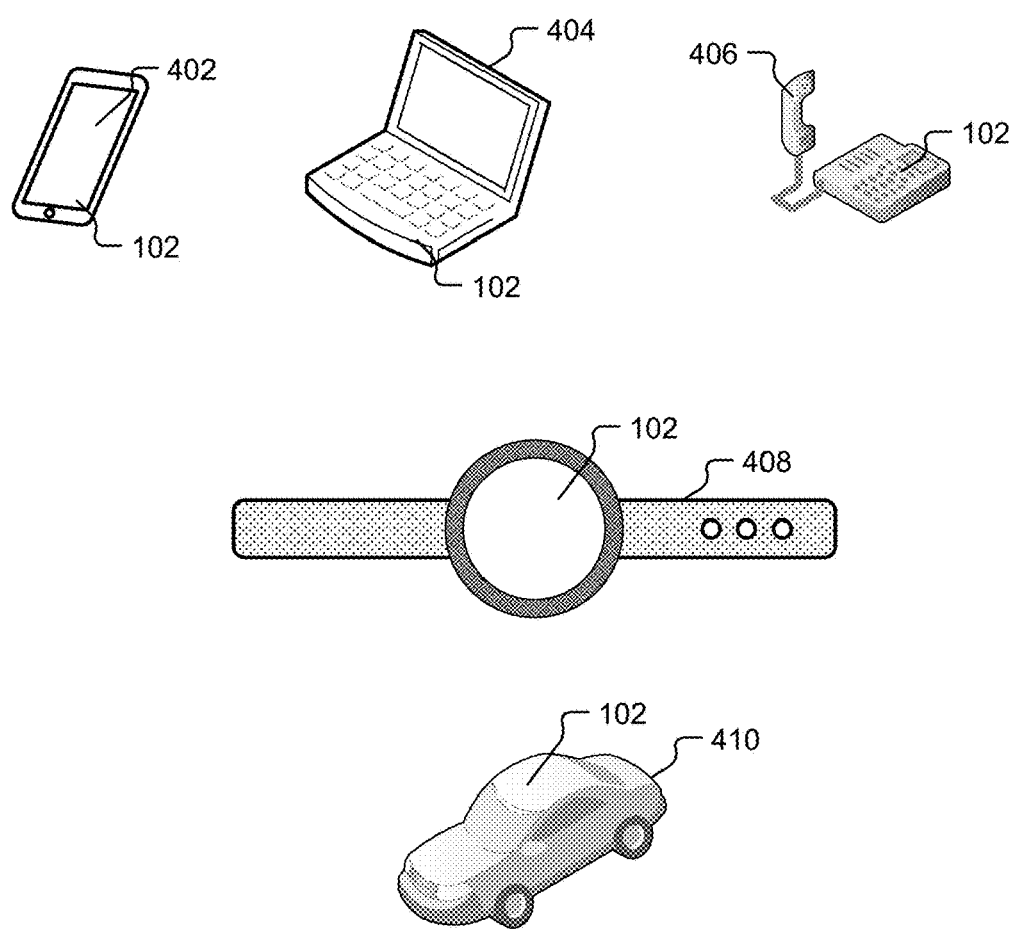
FIG. 4 illustrates various electronic devices that may integrate an electronic circuit, and/or an integrated device, described herein.

FIG. 4 illustrates various electronic devices that may include or be integrated with the device 102. For example, a mobile phone device 402, a laptop computer device 404, a fixed location terminal device 406, a wearable device 408, or a vehicle 410 (e.g., an automobile or an aerial device) may include a device 102 described herein. The devices 402, 404, 406 and 408 and the vehicle 410 illustrated in FIG. 4 are merely exemplary. Other electronic devices may also feature the device 102 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices (e.g., watches, glasses), Internet of things (IoT) devices, servers, routers, electronic devices implemented in vehicles (e.g., autonomous vehicles), or any other device that stores or retrieves data or computer instructions, or any combination thereof.

One or more of the components, processes, features, and/or functions illustrated in FIGS. 1-4 may be rearranged and/or combined into a single component, process, feature or function or embodied in several components, processes, or functions. Additional elements, components, processes, and/or functions may also be added without departing from the disclosure. It should also be noted FIGS. 1-4 and its corresponding description in the present disclosure is not limited to dies and/or ICs. In some implementations, FIGS. 1-4 and its corresponding description may be used to manufacture, create, provide, and/or produce devices and/or integrated devices. In some implementations, a device may include a die, an integrated device, an integrated passive device (IPD), a die package, an integrated circuit (IC) device, a device package, an integrated circuit (IC) package, a wafer, a semiconductor device, a package-on-package (PoP) device, a heat dissipating device, and/or an interposer.

In conjunction with the described implementations, an apparatus includes means for sending, on a data wire of a serial bus from a principal device, a read command addressed to a subordinate device to initiate a read transaction, where the principal device is coupled via the serial bus to one or more subordinate devices. For example, the means for sending can correspond to the protocol controller 140, the principal device 120, the data wire 134, the device 102, the system 100, one or more other circuits or components configured to send, on a data wire of a serial bus from a principal device, a read command addressed to a subordinate device to initiate a read transaction, or any combination thereof.

The apparatus also includes means for modifying, at a protocol controller of the principal device, a clock signal on a clock wire of the serial bus to extend a bus park cycle period, the bus park cycle period extended based on a data preparation delay associated with the subordinate device. For example, the means for modifying can correspond to the protocol controller 140, the principal device 120, the clock wire 132, the device 102, the system 100, one or more other circuits or components configured to modify, at a protocol controller of the principal device, a clock signal on a clock wire of the serial bus to extend a bus park cycle period, or any combination thereof.

The apparatus further includes means for reading data from the data wire during the read transaction, the data read subsequent to the bus park cycle period. For example, the means for reading can correspond to the protocol controller 140, the principal device 120, the device 102, the system 100, one or more other circuits or components configured to read data from the data wire during the read transaction, or any combination thereof.

In some implementations, a non-transitory computer-readable medium (e.g., a computer-readable storage device, such as a memory) includes instructions that, when executed by one or more processors (e.g., the protocol controller 140), cause the one or more processors to send, on a data wire (e.g., the data wire 134) of a serial bus (e.g., the serial bus 130) from a principal device (e.g., the principal device 120), a read command (e.g., the register read command frame 202) addressed to a subordinate device (e.g., the subordinate device 122) to initiate a read transaction. The principal device is coupled via the serial bus to one or more subordinate devices (e.g., the one or more subordinate devices 122). The instructions also cause the one or more processors to modify, at a protocol controller (e.g., the protocol controller 140) of the principal device, a clock signal on a clock wire (e.g., the clock wire 132) of the serial bus to extend a bus park cycle period (e.g., from bus park cycle period 224 to the extended bus park cycle period 228), the bus park cycle period extended based on a data preparation delay (e.g., the data preparation delay 126) associated with the subordinate device. The instructions further cause the one or more processors to. subsequent to the bus park cycle period, read data from the data wire during the read transaction.

Particular aspects of the disclosure are described below in sets of interrelated Examples:

According to Example 1, a principal device includes a protocol controller coupled, via a serial bus, to one or more subordinate devices, wherein the serial bus includes a clock wire and a data wire, and wherein the protocol controller is configured to: send, on the data wire, a read command addressed to a subordinate device to initiate a read transaction; modify a clock signal on the clock wire to extend a bus park cycle period, the bus park cycle period extended based on a data preparation delay associated with the subordinate device; and subsequent to the bus park cycle period, read data from the data wire during the read transaction.

Example 2 includes the principal device of Example 1, wherein the bus park cycle period is extended for a single clock pulse of the clock signal.

Example 3 includes the principal device of Example 1 or Example 2, wherein the data preparation delay is based on at least one of line length, clock domain crossing, or memory access latency associated with the subordinate device.

Example 4 includes the principal device of any of Examples 1 to 3, wherein a line length between the protocol controller and the subordinate device is greater than 15 centimeters.

Example 5 includes the principal device of any of Examples 1 to 4, wherein the protocol controller is integrated into a radio frequency (RF) front-end device.

Example 6 includes the principal device of any of Examples 1 to 5, wherein the protocol controller operates in compliance with a radio frequency front-end (RFFE) MIPI alliance specification.

Example 7 includes the principal device of any of Examples 1 to 6, wherein the protocol controller operates in compliance with a two-wire protocol that supports bus park.

Example 8 includes the principal device of any of Examples 1 to 7, wherein the protocol controller is configured to send, on the data wire, a second read command addressed to a second subordinate device to initiate a second read transaction; modify the clock signal on the clock wire to extend a second bus park cycle period; and subsequent to the second bus park cycle period, read second data from the data wire during the second read transaction.

Example 9 includes the principal device of Example 8, wherein the second bus park cycle period is extended based on the data preparation delay associated with the subordinate device.

Example 10 includes the principal device of Example 8 or Example 9, wherein the second bus park cycle period is extended based on a second data preparation delay associated with the second subordinate device.

Example 11 includes the principal device of any of Examples 8 to 10, wherein the second bus park cycle period has a second duration that is longer than a first duration of the bus park cycle period.

According to Example 12, a method includes sending, on a data wire of a serial bus from a principal device, a read command addressed to a subordinate device to initiate a read transaction, wherein the principal device is coupled via the serial bus to one or more subordinate devices; modifying, at a protocol controller of the principal device, a clock signal on a clock wire of the serial bus to extend a bus park cycle period, the bus park cycle period extended based on a data preparation delay associated with the subordinate device; and subsequent to the bus park cycle period, reading data from the data wire during the read transaction.

Example 13 includes the method of Example 12, wherein the bus park cycle period is extended for a single clock pulse of the clock signal.

Example 14 includes the method of Example 12 or Example 13, wherein the data preparation delay is based on at least one of line length, clock domain crossing, or memory access latency associated with the subordinate device.

Example 15 includes the method of any of Examples 12 to 14, wherein a line length between the protocol controller and the subordinate device is greater than 15 centimeters.

Example 16 includes the method of any of Examples 12 to 15, wherein the protocol controller is integrated into a radio frequency (RF) front-end device.

Example 17 includes the method of any of Examples 12 to 16, wherein the protocol controller operates in compliance with a radio frequency front-end (RFFE) MIPI alliance specification.

Example 18 includes the method of any of Examples 12 to 17, wherein the protocol controller operates in compliance with a two-wire protocol that supports bus park.

Example 19 includes the method of any of Examples 12 to 18, further includes sending, on the data wire from the principal device, a second read command addressed to a second subordinate device to initiate a second read transaction; modifying, at the protocol controller, the clock signal on the clock wire to extend a second bus park cycle period; and subsequent to the second bus park cycle period, reading second data from the data wire during the second read transaction.

Example 20 includes the method of Example 19, wherein the second bus park cycle period is extended based on the data preparation delay associated with the subordinate device.

Example 21 includes the method of Example 19 or Example 20, wherein the second bus park cycle period is extended based on a second data preparation delay associated with the second subordinate device.

Example 22 includes the method of any of Examples 19 to 21, wherein the second bus park cycle period has a second duration that is longer than a first duration of the bus park cycle period.

According to Example 23, a non-transitory computer-readable medium storing instructions that, when executed by one or more processors, cause the one or more processors to send, on a data wire of a serial bus from a principal device, a read command addressed to a subordinate device to initiate a read transaction, wherein the principal device is coupled via the serial bus to one or more subordinate devices; modify, at a protocol controller of the principal device, a clock signal on a clock wire of the serial bus to extend a bus park cycle period, the bus park cycle period extended based on a data preparation delay associated with the subordinate device; and subsequent to the bus park cycle period, read data from the data wire during the read transaction.

Example 24 includes the non-transitory computer-readable medium of Example 23, wherein the bus park cycle period is extended for a single clock pulse of the clock signal.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A principal device comprising:
   a protocol controller coupled, via a serial bus, to one or more subordinate devices, wherein the serial bus includes a clock wire and a data wire, and wherein the protocol controller is configured to:
      send, on the data wire, a read command addressed to a subordinate device to initiate a read transaction;
      modify a clock signal on the clock wire to extend a bus park cycle period, the bus park cycle period extended based on a data preparation delay associated with the subordinate device;
      subsequent to the bus park cycle period, read data from the data wire during the read transaction;
      send, on the data wire, a second read command addressed to a second subordinate device to initiate a second read transaction;
      modify the clock signal on the clock wire to extend a second bus park cycle period; and
      subsequent to the second bus park cycle period, read second data from the data wire during the second read transaction.

2. The principal device of claim 1, wherein the bus park cycle period is extended for a single clock pulse of the clock signal.

3. The principal device of claim 1, wherein the data preparation delay is based on at least one of line length, clock domain crossing, or memory access latency associated with the subordinate device.

4. The principal device of claim 1, wherein a line length between the protocol controller and the subordinate device is greater than 15 centimeters.

5. The principal device of claim 1, wherein the protocol controller is integrated into a radio frequency (RF) front-end device.

6. The principal device of claim 1, wherein the protocol controller operates in compliance with a radio frequency front-end (RFFE) MIPI alliance specification.

7. The principal device of claim 1, wherein the protocol controller operates in compliance with a two-wire protocol that supports bus park.

8. The principal device of claim 1, wherein the second bus park cycle period is extended based on the data preparation delay associated with the subordinate device.

9. The principal device of claim 1, wherein the second bus park cycle period is extended based on a second data preparation delay associated with the second subordinate device.

10. The principal device of claim 9, wherein the protocol controller is configured to:
    determine a representative bus park cycle extension based on a weighted sum of the data preparation delay and the second data preparation delay, where a first weight is applied to the data preparation delay and a second weight is applied to the second data preparation delay, wherein the bus park cycle period is extended based on the representative bus park cycle extension.

11. The principal device of claim 1, wherein the second bus park cycle period has a second duration that is longer than a first duration of the bus park cycle period.

12. A method comprising:
sending, on a data wire of a serial bus from a principal device, a read command addressed to a subordinate device to initiate a read transaction, wherein the principal device is coupled via the serial bus to one or more subordinate devices;
modifying, at a protocol controller of the principal device, a clock signal on a clock wire of the serial bus to extend a bus park cycle period, the bus park cycle period extended based on a data preparation delay associated with the subordinate device;
subsequent to the bus park cycle period, reading data from the data wire during the read transaction;
sending, on the data wire from the principal device, a second read command addressed to a second subordinate device to initiate a second read transaction;
modifying, at the protocol controller, the clock signal on the clock wire to extend a second bus park cycle period; and
subsequent to the second bus park cycle period, reading second data from the data wire during the second read transaction.

13. The method of claim 12, wherein the bus park cycle period is extended for a single clock pulse of the clock signal.

14. The method of claim 12, wherein the data preparation delay is based on at least one of line length, clock domain crossing, or memory access latency associated with the subordinate device.

15. The method of claim 12, wherein the second bus park cycle period is extended based on the data preparation delay associated with the subordinate device.

16. The method of claim 12, wherein the second bus park cycle period is extended based on a second data preparation delay associated with the second subordinate device.

17. The method of claim 16, further comprising:
determining a representative bus park cycle extension based on a weighted sum of the data preparation delay and the second data preparation delay, where a first weight is applied to the data preparation delay and a second weight is applied to the second data preparation delay, wherein the bus park cycle period is extended based on the representative bus park cycle extension.

18. The method of claim 12, wherein the second bus park cycle period has a second duration that is longer than a first duration of the bus park cycle period.

19. A non-transitory computer-readable medium storing instructions that, when executed by one or more processors, cause the one or more processors to:
send, on a data wire of a serial bus from a principal device, a read command addressed to a subordinate device to initiate a read transaction, wherein the principal device is coupled via the serial bus to one or more subordinate devices;
modify, at a protocol controller of the principal device, a clock signal on a clock wire of the serial bus to extend a bus park cycle period, the bus park cycle period extended based on a data preparation delay associated with the subordinate device;
subsequent to the bus park cycle period, read data from the data wire during the read transaction;
send, on the data wire from the principal device, a second read command addressed to a second subordinate device to initiate a second read transaction;
modify, at the protocol controller, the clock signal on the clock wire to extend a second bus park cycle period; and
subsequent to the second bus park cycle period, read second data from the data wire during the second read transaction.

20. The non-transitory computer-readable medium of claim 19, wherein the bus park cycle period is extended for a single clock pulse of the clock signal.

* * * * *